INVENTOR.
Harry H. Wrightman
BY Harry W. Opdyke
Barthel & Bugbee
ATT'YS

Patented July 15, 1947

2,424,203

UNITED STATES PATENT OFFICE 2,424,203

JOURNAL SAFETY DEVICE

Harry H. Wrightman, Detroit, Mich., and
Harry W. Opdyke, Montpelier, Ohio

Application January 9, 1946, Serial No. 639,950

1 Claim. (Cl. 246—169)

This invention relates to railway equipment safety devices and in particular, to a journal box safety device for automatically applying the brakes upon overheating through improper or inadequate lubrication.

One object of this invention is to provide a journal box safety device having a fusible plug in an air brake connection adjacent the bearing or journal box, together with a plunger-like element which forces substantially all of the fusible metal out of the connection when it is melted by overheating of the journal box, thereby releasing air and causing the brakes to be automatically applied.

Another object is to provide a journal box safety device as set forth in the preceding object wherein the connection consists of a fitting insertable into one of the bearing brasses of each journal box on the car truck whereby the fusible plug will be quickly melted before serious damage is caused by overheating of the bearing and the brakes applied automatically upon expulsion of the plug.

Another object is to provide a journal box safety device as set forth in the preceding objects wherein the bearing brass is drilled to provide a connection to the air brake system, the opposite end of the bore having a tubular fitting therein containing a fusible plug and a pusher element behind the plug for expelling the plug material completely upon overheating of the bearing.

Other objects and advantages of the invention will become apparent during the course of the following description of the accompanying drawing, wherein.

This application is a continuation in part of our co-pending application Serial No. 601,420, filed June 25, 1945. In this previous application, from experience it has been found that when the fusible plug melts, and is blown outward by the air pressure, often the central portion only is blown out, the portions adjacent the wall being immediately cooled by the air blast and prevented from melting. This has resulted in the air release passageway being unduly restricted and hence has delayed unnecessarily the time or force of application of the air brake. The present invention provides a pusher element in the form of a plunger-like disc immediately behind the fusible plug, the disc pushing out substantially all of the fusible plug when the latter melts, thereby opening up a large air release passageway for the escape of the air from the air brake system, and very rapidly applying the air brakes and halting the train quickly.

Figure 1:
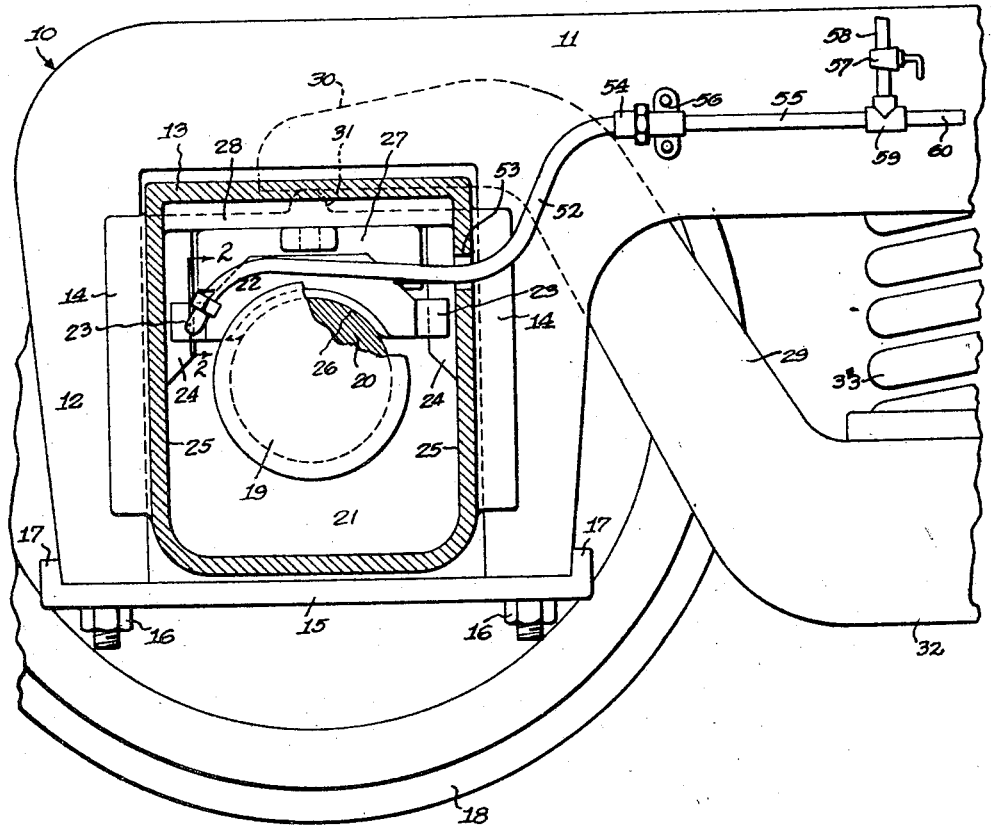
Figure 1 is a side elevation of a journal box on a railway car truck, partly broken away to show the installation of the safety fitting on one of the bearing brasses thereof.

Referring to the drawing in detail, Figure 1 shows a railway car truck generally designated 10, having side frames 11 with depending portions 12 between which is slidably guided a conventional journal box 13, as by the guide flanges 14 which overlie and slidably engage the depending frame portions 12. The lower ends of the latter are interconnected by a tie member 15 bolted thereto as at 16 and having upwardly bent ends 17.

The car truck 10 is provided with wheels 18 mounted on the usual axle 19 rotatably supported by the journals 20 extending into the journal box 13. The journal box 13 is provided with an internal chamber 21 filled with lubricant and optionally fibrous wick material (not shown) for feeding this lubricant to the journal 20. The journal 20 is engaged by a bearing brass 22 having lugs 23 engaging vertical ribs 24 on the inner side walls 25 of the journal box 13. The lower face of the bearing brass 22 is provided with a bearing face 26 of Babbitt metal or other suitable bearing material, which provides a bearing surface for engagement with the journal 20. The bearing brass 22 is removably held in place by a wedge plate 27 inserted between the top thereof and the top portion 28 of the journal box 13. Connection is made to the car by a downwardly bent frame member 29 having its upper ends 30 (one only being shown) engaging the rib 31 on the journal box 13. The lower or central portion 32 of the frame member 29 supports coil springs 33, the opposite ends of which engage the side frames 11 so as to provide a resilient suspension therebetween and yieldingly support the weight of the railway car.

Figure 2:
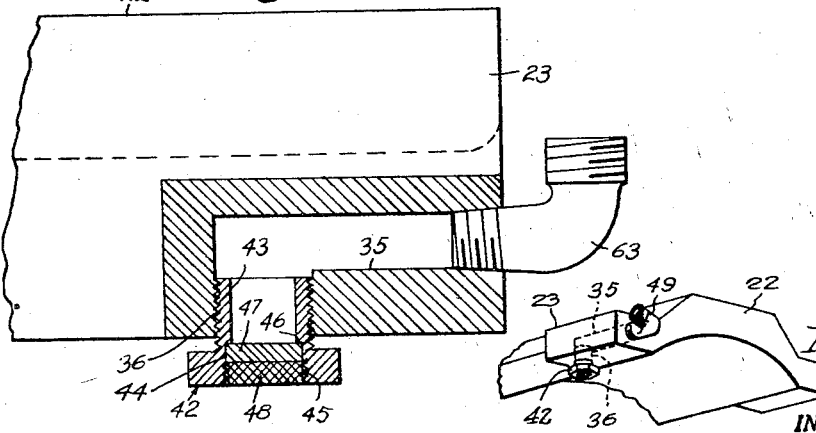
Figure 2 is an enlarged vertical section through the bearing brass and safety fitting taken along the line 2—2 in Figure 1.
Figure 3:
Figure 3 is a fragmentary perspective view of a bearing brass of Figure 1 drilled to provide a bore connected at one end to the air brake system and having the safety fitting installed at the other end thereof.

The bearing brass 22, at any convenient location, such as in one of the lugs 23, is provided with threaded interconnected bores 35 and 36 (Figure 2). Threaded into the outer end of the bore 36 is a hollow safety plug 42 having a bore 43 therethrough. The bore 43 terminates in an outwardly enlarged portion 44 which in turn leads into a threaded portion 45 at the outer end of the plug 42. Seated in the enlarged portion 44 of the bore 43 against the annular shoulder 46 therebetween is a pusher disc 47 of relatively high melting material. Seated in the threaded portion 45 and backing up against the pusher disc 47 is a fusible plug 48 preferably of fusible metal, melting at a relatively low temperature, this being held in position by the threads of the threaded portion 45. The pusher disc 47 is loosely mounted in the bore enlargement 44 so as to be freely and slidably movable therein.

Threaded into the outer end of the bore 35 is an elbow fitting 49 which is threaded as at 50 to receive a connection 51 for the end of the air brake pipe 52 which passes through an aperture 53 in the journal box 13. The pipe 52 is preferably of flexible construction for connection as at 54 to the air brake conduit 55 which is secured by the bracket 56 to the side frames 11. The conduit 55 is provided with a control valve 57 in a supply line 58 connected as at the T 59 to a branch conduit 60, leading in a similar manner to another journal box 13. The air supply pipe 58 leads to the conventional brake operating mechanism of the car truck in the usual manner.

In the operation of the invention, with the device installed and connected as shown in the drawings and described above, if for any reason the journal bearing is caused to overheat to a dangerous point, this heat is transmitted to the hollow safety plug 42 where it heats up the fusible metal plug 48, the transmission of heat thereto being assisted by the pusher disc 47. Under the influence of this heat, the fusible metal plug 48 melts, whereupon the pusher disc 47, impelled by the air pressure within the bores 35 and 36 from the air brake system of the train, is forced outwardly, pushing ahead of it the melted portion of the fusible plug 48 and expelling substantially all of the fusible plug. This action is sudden and positive, and opens up a large port substantially the full diameter of the bore 43 in the safety plug 42, venting the air from the air brake system almost instantaneously after the pusher disc 47 is expelled. The escape of the air automatically applies the brakes to the wheels 18 and brings the car to a halt in accordance with the well-known operation of railway air brake systems. Thus the car comes to a halt before serious damage is caused.

This braking action is not delayed by the relatively slower venting which occasionally occurs with prior devices when a fusible plug is used without a pusher disc 47 or other equivalent expelling member. In such prior devices, the melting of the fusible plug occasionally occurs unevenly so that a small portion only of the plug is expelled before the outrushing air cools the remainder of the plug so quickly as to prevent its expulsion. Under these circumstances, only a comparatively small passageway is occasionally melted through the fusible plug and the venting of the air brake system is either ineffective or takes place so slowly that damage is caused before the brakes are effectively applied. The present invention, by the provision of a pusher member for expelling the fusible plug avoids this disadvantage since substantially all of the fusible plug is expelled simultaneously and the cooling effect of the outrushing air has no such adverse effect upon the action of the safety device.

While we have shown and described our invention in detail, it is to be understood that the same is to be limited only by the appended claim, and that many changes may be made without departing from the spirit and scope of our invention.

What we claim is:

A safety device for railway trains equipped with air brake systems comprising a bearing unit having an air passageway extending through a portion thereof, an air brake conduit coupling mounted at one end of said passageway for connection to said air brake system, a tubular fitting mounted at the other end of said passageway and having a bore therethrough terminating at its outer end in an enlarged counterbore, said fitting having a shoulder between said bore and counterbore and having a solid side wall surrounding said counterbore, a relatively low-melting fusible plug secured in the outer portion of said counterbore, and a relatively high-melting pusher disc loosely and slidably mounted in the inner portion of said counterbore with one surface thereof in abutting engagement with said shoulder and the other surface in abutting engagement with said fusible plug, said pusher disc having an edge wall which is relatively thick in proportion to its diameter, guidingly engaging the side wall of said counterbore.

HARRY H. WRIGHTMAN.
HARRY W. OPDYKE.

REFERENCES CITED

The following references are of record in the file of this patent:

UNITED STATES PATENTS

| Number | Name | Date |
|---|---|---|
| 1,690,050 | Blair | Oct. 30, 1928 |
| 1,317,759 | Ross | Oct. 7, 1919 |
| 2,128,091 | Iversen | Aug. 23, 1938 |

FOREIGN PATENTS

| Number | Country | Date |
|---|---|---|
| 5,440 | Great Britain | 1886 |